May 28, 1957 N. N. SCHAEDLER 2,793,768
MOTOR VEHICLE HOISTING APPARATUS FOR INVALIDS
Filed Oct. 26, 1955 3 Sheets-Sheet 1

Norbert N. Schaedler
INVENTOR.

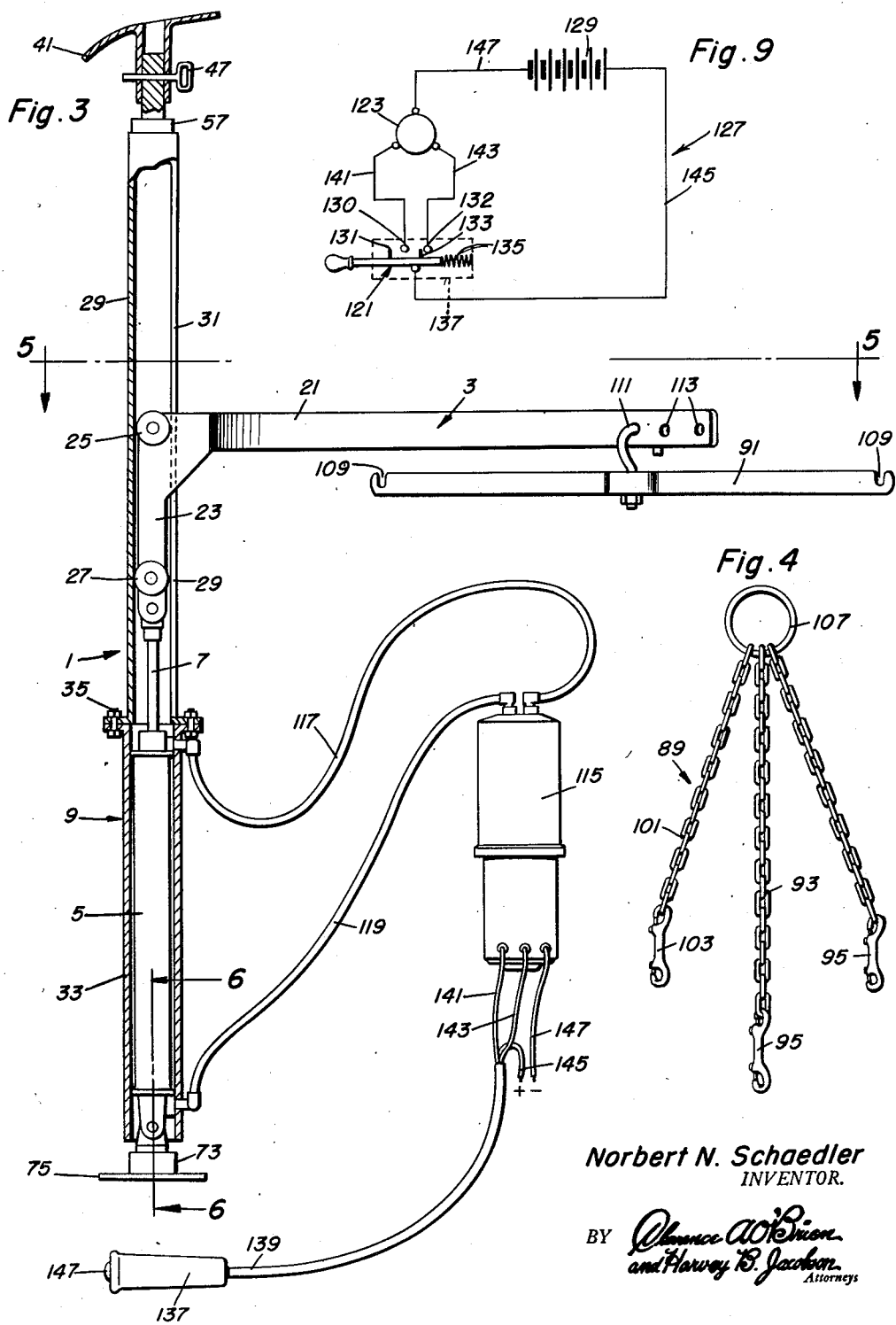

May 28, 1957  N. N. SCHAEDLER  2,793,768
MOTOR VEHICLE HOISTING APPARATUS FOR INVALIDS
Filed Oct. 26, 1955  3 Sheets-Sheet 3
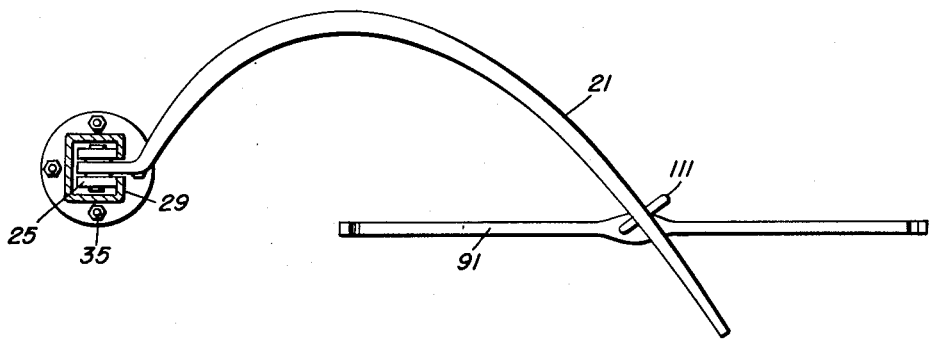
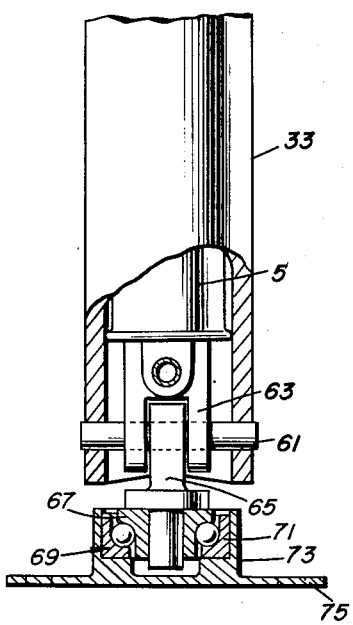
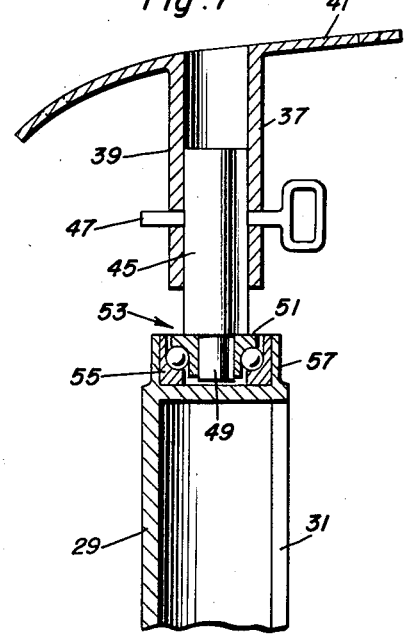
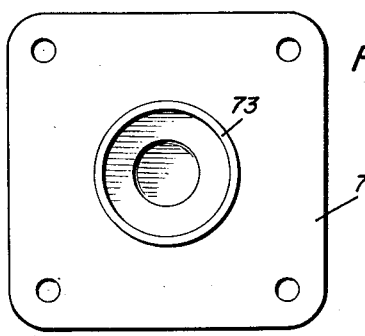
Norbert N. Schaedler
INVENTOR.

United States Patent Office 2,793,768
Patented May 28, 1957

2,793,768

MOTOR VEHICLE HOISTING APPARATUS FOR INVALIDS

Norbert N. Schaedler, Deschutes County, Oreg., assignor to O & B Development Co., Bend, Oreg., a partnership Application October 26, 1955, Serial No. 542,812

5 Claims. (Cl. 214—75)

My invention relates to improvements in hoisting apparatus of the crane type for invalids.

The primary object of my invention is to provide pneumatic hoisting apparatus for installation in an automobile to lift an invalid out of a wheeling chair, and to swing the invalid into an automobile through a side door thereof and lower him or her onto an automobile seat, or to lift the invalid off the seat swing him or her out of the door and lower the invalid into the chair all while the invalid is comfortably seated and supported.

Another object is to provide apparatus operative for the above purposes and controlled as regards lifting and lowering by the seated invalid.

Still another object is to provide apparatus of the type and for the purposes above set forth which is safe to use, adapted for installation in present day closed body automobiles without alteration in the body and is comparatively inexpensive to manufacture, install, and service.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged view partly in vertical section and partly in side elevation of the apparatus;

Figure 4 is an enlarged view in side elevation of one of a pair of chain hangers forming part of a sling of the apparatus;

Figure 5 is a detail view in horizontal section taken on the line 5—5 of Figure 3;

Figure 6 is an enlarged view in vertical section taken on the line 6—6 of Figure 3 and illustrating details of the lower portion of a pneumatic crane forming part of the apparatus;

Figure 7 is an enlarged fragmentary view in vertical section taken on the line 7—7 of Figure 6 and illustrating details of the upper portion of the crane;

Figure 8 is an enlarged view in plan of an attaching plate of the crane, and

Figure 9 is a diagrammatic view of an electric circuit for controlling a motor of the apparatus.

Figure 1:
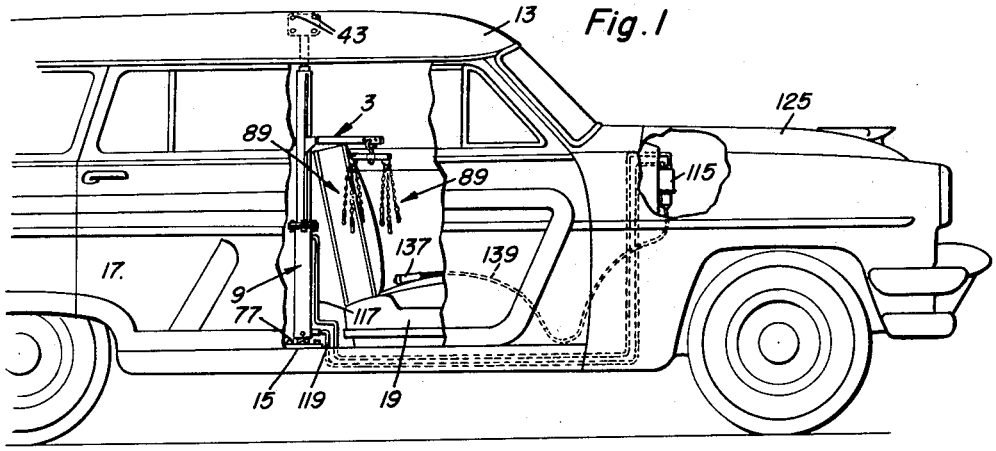
Figure 1 is a view in side elevation partly broken away and shown in broken lines of my improved apparatus installed in an automobile.
Figure 2:
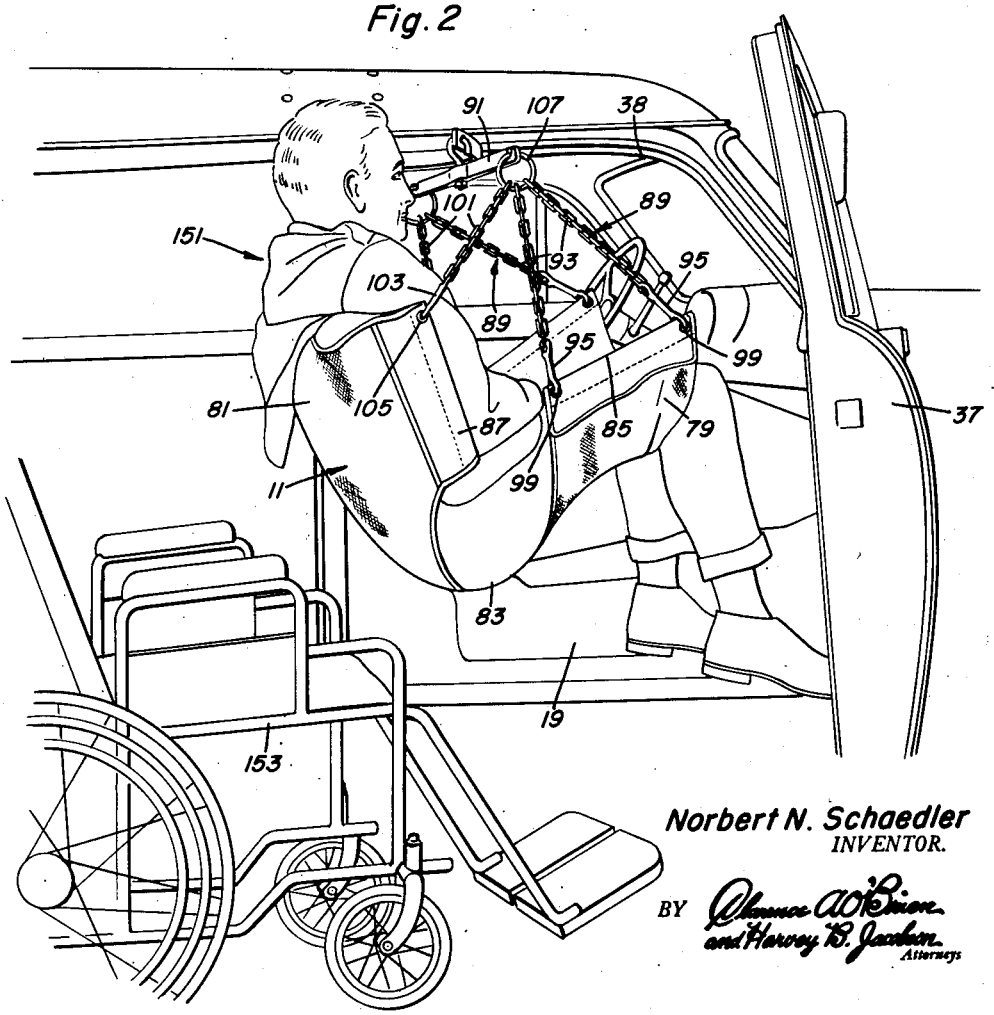
Figure 2 is an enlarged fragmentary view in perspective illustrating the apparatus operated to lift an invalid out of a wheel chair preparatory to swinging the invalid into the automobile for lowering onto the front seat of the automobile.

Referring to the drawings by numerals, the pneumatic hoisting apparatus of my invention as illustrated comprises a pneumatic hoisting crane, designated generally by the numeral 1, which includes a vertically movable crane arm 3, laterally swingable manually, a pneumatic cylinder 5 with a piston rod 7 operatively connected to the crane arm, a tubular guide casing 9 for the crane arm 3, an invalid supporting sling 11 carried by the crane arm 3, and means for attaching the crane to the top 13 and floor 15 of an automobile body 17 in the rear of an automobile seat 19.

The crane arm 3 is of right angled shape with a horizontal portion 21 and a vertical portion 23 provided with upper and lower pairs of laterally spaced rollers 25, 27 by means of which said arm is rollably mounted for vertical guided movement in an upper section 29 of the tubular casing 9 of the crane 1 with the horizontal portion extending out of said section 29 through a vertical slot 31 in the section 29. The tubular guide casing 9 further includes a lower section 33 bolted, as at 35, to the upper section 20 and which houses the pneumatic cylinder 5, the piston rod 7 extending into the upper section 29.

The guide casing 9 is attached at its upper end in upright position in the body 17 adjacent one front door 37 by means of a tubular socket 39 at the upper end of said guide casing. The socket 39 depends from an attaching plate 41 curved to fit the roof 13 of the body 17 and bolted thereto as at 43. A stud 45 is detachably fixed for assembly purposes in the socket 39 by a removable cross pin 47 and depends from said socket 39 with a reduced lower end 49 on which is sleeved the inner race member 51 of an end and radial thrust ball bearing unit 53 the outer race member 55 of which is fitted in an annular collar 57 on the upper end of the upper section 29 of said casing 9. Thus the guide casing 9 is rotatably mounted at its upper end.

At its lower end the guide casing 9 is rotatably mounted by a cross pin 61 extending through the lower section 33 and through a bifurcated lug 63 on the lower end of the cylinder 5 and also through an upstanding flanged stud 65 rising from the inner race member 67 of an end and radial thrust ball bearing unit 69 the outer race member 71 of which is fitted in a collar 73 on a bottom attaching plate 75 for said guide bolted, as at 77, to the floor 15 of the body 17. As will be seen the pin 61 forms a pivot for the lower end of the guide 9 and for the cylinder 5 for positioning the guide 9 perpendicular to the floor 15 and roof 13 and is removable for disassembly of the parts of the crane 1.

The horizontal portion 21 of the crane arm 3 curves laterally toward the door 37 of the doorway 38, projects forwardly over the seat 19 and carries the sling 11 at its forward end.

The sling 11 comprises a strip of canvas, or the like, having a front horizontal trough-shaped thigh rest end 79, an upright rear, trough shaped back rest end 81, and an intermediate seat portion 83.

The side edges 85, 87 of the thigh rest and back rest ends 77, 81 are suitably reinforced.

Pairs of triple chain hangers 89 swingably suspend the thigh rest end 79 and the back rest end 81 from a hanger bar 91. The hangers 89 comprise a pair of chains 93 pivotally connected to the side edges 85 of the thigh rest end 79 by terminal snap hooks 95 thereon detachably inserted through eyes 99 in said edges 85 and single chains 101 with the terminal snap hooks 103 attachably inserted in eyes 105 in the side edges 87 at the upper end of the back rest end 81.

The chains 95, 101 of the hangers 89 depend from a pair of rings 107 hooking over the ends of the hanger bar 91 and seating in upper edge notches 109 in the cross bar 91 whereby the sling 11 is detachably suspended from said cross bar.

The hanger bar 91 is swingably suspended from the front end of the horizontal arm 21 and adjustably along said arm to correspondingly adjust the sling 11 by means of a central hanger hook 111 on said bar insertable selectively in longitudinally spaced apertures 113 in said horizontal arm 21.

A motor driven pump unit 115 is provided and suitably connected by pressure lines 117, 119 to the upper and lower ends of the cylinder 5 to supply pressure to said upper and lower end under control of a switch 121. The unit 115 is of any conventional type that is reversible by reversing its motor 123 to raise the crane arm 21 and sling 11 or control lowering of said arm and sling under the influence of gravity and is preferably suitably mounted under the automobile hood 125 with the motor 123 interposed in a suitable electric circuit 127 with the ignition battery 129 and the switch 121.

The switch 121 for the purpose of illustration is shown as being of the plunger type movable from circuit opening position shown in Figure 9 to engage with pairs of fixed and movable contacts 130, 131, 132, 133 for operation of the pump unit 115 to effect raising or lowering of the crane arm 121 and spring tensioned as at 135 against movement from circuit opening position. The switch 121, contacts 130, 131, 132, 133 and spring 135 are suitably housed in a terminal hand piece 137 on a flexible cable 139 suitably extended from the unit 115 for grasping of the hand piece 137 by an occupant of the sling 11. Circuit wires 141, 143 from the motor 123 to the fixed contacts 130, 132 and a circuit wire 145 from one side of the battery 129 extend through the cable 139 and a circuit wire 147 extending from said unit 115 connects the other side of the battery 129 to the motor 123.

The motor driven pump unit 115 forms per se no part of my invention only as it may enter into combination with the remainder of the apparatus.

An invalid represented at 151 desiring to enter the automobile body 17 from a wheel chair 153 is wheeled or wheels himself close to the doorway 38 with the door 37 open. The sling 11 is then positioned under him while it is detached from the chain hangers 89 as shown in Figure 1 and he grasps the hand piece 137 and operates the switch 121 to lower the crane arm 21 if the same has been raised. The crane arm 21 may then be swung by him out of the doorway 38, while he is sitting in the wheel chair 153, and the chain hangers 89 attached to the thigh and back rest ends 79, 81 by the snap hooks 95, 103 after which the switch 121 is operated to cause the crane arm 21 to be raised to lift the invalid above the seat 19. He may then as by grasping the back of the seat 19 swing himself into the body 17 over the seat 19 thereby swinging the crane arm 21 into said body. Then by operating the switch 121 to cause lowering of the crane arm 21 he may lower himself onto the seat 19 after which the chain hangers 89 may be detached from the thigh and back rest ends 79, 81 and the crane arm 21 together with said hangers shoved aside out of the way. The manner in which the invalid may operate the apparatus to lift himself off the seat 19, swing himself out of the doorway 38 and lower himself into the wheel chair 153 will it is believed be understood without explanation.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the invention as claimed.

What is claimed as new is as follows:

1. Hoisting apparatus comprising a vertical tubular guide having upper and lower ends and a longitudinal slot, a crane arm having a horizontal portion extending out of said guide through said slot and a vertical portion rollably mounted in said guide whereby said arm is movable upwardly and downwardly, a sling suspended from said horizontal portion to seat a person and movable upwardly and downwardly by said arm to raise and lower a person occupying the sling, means rotatably mounting said guide at its ends and attachable to the roof and floor of an automobile body to rotatably mount said guide in the rear of an automobile seat for lateral swinging of said horizontal portion out of and into a doorway of an automobile whereby the sling may be swung into an automobile body to correspondingly swing an occupant of the sling over an automobile seat when said arm is raised and for lowering onto a seat when said arm is lowered, fluid pressure means for raising and lowering said arm controllable by a person in said sling.

2. The combination of claim 1, said sling including a cross bar pivotally mounted on said horizontal arm, and seat and back portions, and triple chain hangers detachably connected to said bar and to said back and seat portions.

3. The combination of claim 1, said last named means comprising a fluid pressure cylinder housed in the lower end of said guide and having a piston rod operatively connected to said vertical portion.

4. The combination of claim 1, said last named means comprising an electrically operated motor remote from said sling and a flexible cable extending from said motor to said sling and terminating in a motor control hand piece for operation at said sling.

5. The combination of claim 1, said horizontal portion being laterally curved to facilitate swinging the same out of and into a doorway of an automobile.

References Cited in the file of this patent

UNITED STATES PATENTS

| | | |
|---|---|---|
| 2,497,474 | Snow | Feb. 14, 1950 |
| 2,512,988 | Adams | June 27, 1950 |
| 2,565,091 | Reed | Aug. 21, 1951 |
| 2,576,660 | Williams | Nov. 27, 1951 |
| 2,650,725 | Hoyer et al. | Sept. 1, 1953 |